US012664138B2

(12) United States Patent
Ghosh et al.

(10) Patent No.: US 12,664,138 B2
(45) Date of Patent: Jun. 23, 2026

(54) SYSTEMS AND METHODS FOR TRACKING OF DATA RECORDS

(71) Applicant: Fidelity Information Services, LLC, Jacksonville, FL (US)

(72) Inventors: Ranadhir Ghosh, St Johns, FL (US); Ankit Arora, Delhi (IN); Prajwal M, Bengaluru (IN); John Platais, Menomonee Falls, WI (US)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

(21) Appl. No.: 18/962,610

(22) Filed: Nov. 27, 2024

(65) Prior Publication Data

US 2025/0110936 A1     Apr. 3, 2025

Related U.S. Application Data

(63) Continuation-in-part of application No. 18/478,106, filed on Sep. 29, 2023, now Pat. No. 12,405,805.

(51) Int. Cl.
| | |
|---|---|
| G06F 16/00 | (2019.01) |
| G06F 16/21 | (2019.01) |
| G06F 16/23 | (2019.01) |

(52) U.S. Cl.
CPC ........ G06F 16/219 (2019.01); G06F 16/2322 (2019.01)

(58) Field of Classification Search
CPC ............................ G06F 16/219; G06F 16/2322
USPC ........................................................ 707/695
See application file for complete search history.

(56) References Cited

U.S. PATENT DOCUMENTS

| | | | |
|---|---|---|---|
| 2014/0173741 A1* | 6/2014 | Gluck | G06F 21/54 |
| | | | 726/25 |
| 2023/0252278 A1 | 8/2023 | Kweider et al. | |
| 2024/0078227 A1* | 3/2024 | Zhang | G06F 9/5016 |
| 2025/0013657 A1 | 1/2025 | Farooq | |

FOREIGN PATENT DOCUMENTS

CN          114116426 A       3/2022

OTHER PUBLICATIONS

International Search Report and Written Opinion issued in International Application No. PCT/US2024/048957, issued Oct. 24, 2025 (14 pages).

* cited by examiner

*Primary Examiner* — Chelcie L Daye
(74) *Attorney, Agent, or Firm* — Bookoff McAndrews, PLLC

(57)          ABSTRACT
A computer-implemented method for tracking a data object in a data pipeline. The method may include receiving a data object from an data source; assigning a record number to the data object; determining a first tracking stamp for the data object; broadcasting the first tracking stamp to a channel of a record tracking queue; initiating a record in the record tracking queue for the data object, the record including the record number, a station array, a station code, and a time-stamp array, wherein the first tracking stamp updates the station array, station code, and timestamp array; transferring the data object to a second component; determining a second tracking stamp for the data object, the second tracking stamp including the record number; broadcasting the second tracking stamp to the channel; and updating the record with the second tracking stamp to indicate that the data object was received by the second component.

20 Claims, 6 Drawing Sheets

200

300

302 TRANSFER DATA OBJECT

304 DETERMINE SECOND TRACKING STAMP

306 BROADCAST SECOND TRACKING STAMP

308 UPDATE RECORD TRACKING QUEUE

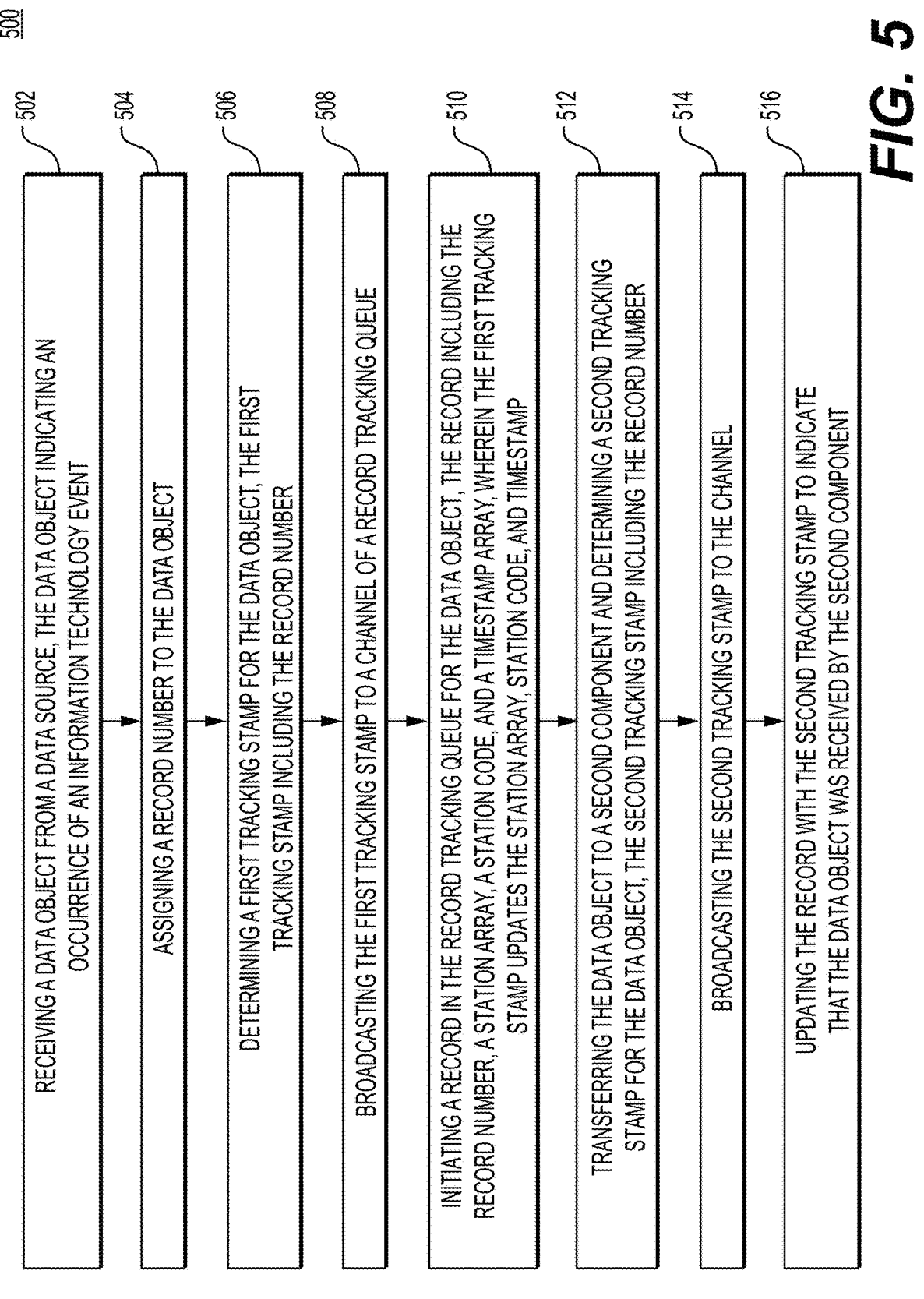

500

502 — RECEIVING A DATA OBJECT FROM A DATA SOURCE, THE DATA OBJECT INDICATING AN OCCURRENCE OF AN INFORMATION TECHNOLOGY EVENT

504 — ASSIGNING A RECORD NUMBER TO THE DATA OBJECT

506 — DETERMINING A FIRST TRACKING STAMP FOR THE DATA OBJECT, THE FIRST TRACKING STAMP INCLUDING THE RECORD NUMBER

508 — BROADCASTING THE FIRST TRACKING STAMP TO A CHANNEL OF A RECORD TRACKING QUEUE

510 — INITIATING A RECORD IN THE RECORD TRACKING QUEUE FOR THE DATA OBJECT, THE RECORD INCLUDING THE RECORD NUMBER, A STATION ARRAY, A STATION CODE, AND A TIMESTAMP ARRAY, WHEREIN THE FIRST TRACKING STAMP UPDATES THE STATION ARRAY, STATION CODE, AND TIMESTAMP

512 — TRANSFERRING THE DATA OBJECT TO A SECOND COMPONENT AND DETERMINING A SECOND TRACKING STAMP FOR THE DATA OBJECT, THE SECOND TRACKING STAMP INCLUDING THE RECORD NUMBER

514 — BROADCASTING THE SECOND TRACKING STAMP TO THE CHANNEL

516 — UPDATING THE RECORD WITH THE SECOND TRACKING STAMP TO INDICATE THAT THE DATA OBJECT WAS RECEIVED BY THE SECOND COMPONENT

FIG. 5

SYSTEMS AND METHODS FOR TRACKING OF DATA RECORDS

CROSS-REFERENCE TO RELATED APPLICATION(S)

This patent application is a continuation-in-part of and claims the benefit of priority to U.S. application Ser. No. 18/478,106, filed on Sep. 29, 2023, the entirety of which is incorporated herein by reference.

TECHNICAL FIELD

Various embodiments of the present disclosure relate generally to information technology (IT) management systems and, more particularly, to systems and methods for tracking of data records and imputation of missing records.

BACKGROUND

In computing systems, for example computing systems that perform financial services and electronic payment transactions, programing changes may occur. For example, software may be updated. Changes in the system may lead to, defects, issues, bugs or problems (collectively referred to as incidents) within the system. These incidents may occur at the time of a software change or at a later time. These incidents may be costly for the company, as users may not be able to use the services, and due to resources expended by the company to resolve the incidents.

These incidents in the system may need to be examined and resolved in order to have the software services perform correctly. Time may be spent by, for example, incident resolution teams, determining what issues arose within the software services. The faster an incident may be resolved, the less potential costs a company may incur. Thus, promptly identifying and fixing such incidents (e.g., writing new code or updating deployed code) may be important to a company.

Data pipelines may route and process millions of data points in real-time. Inadequate monitoring and alerting mechanism of data moving through the data pipelines may lead to negative impacts on downstream processes. The present disclosure is directed to addressing this and other drawbacks to the existing computing system analysis techniques.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

In some aspect, In some aspects, the techniques described herein relate to a method for tracking a data object in a data pipeline, the method including: receiving a data object from an data source, the data object indicating an occurrence of an information technology event; assigning a record number to the data object; determining a first tracking stamp for the data object, the first tracking stamp including the record number; broadcasting the first tracking stamp to a channel of a record tracking queue; initiating a record in the record tracking queue for the data object, the record including the record number, a station array, a station code, and a timestamp array, wherein the first tracking stamp updates the station array, station code, and timestamp array; transferring the data object to a second component; determining a second tracking stamp for the data object, the second tracking stamp including the record number; broadcasting the second tracking stamp to the channel; and updating the record with the second tracking stamp to indicate that the data object was received by the second component.

In some aspects, the techniques described herein relate to a method, wherein the first tracking stamp further includes a plurality of fields, the plurality of fields including a record number field that includes the record number.

In some aspects, the techniques described herein relate to a method, wherein the plurality of fields further includes a first record queue field, a first record time entry field, and a first counter field, wherein the first record queue field records that the first tracking stamp was created at the collection point; wherein the first record time entry field records the time that the data objected was received by a collection point; and wherein the first counter field records what number interconnected component the first data object was received by.

In some aspects, the techniques described herein relate to a method, wherein the record is stored as a log file in the record tracking queue.

In some aspects, the techniques described herein relate to a method, wherein the updating the record to incorporate that the data object was received by the second component further includes: updating the station array to include a string listing the second component; updating the timestamp array to include a time the data objected was received by the second data object; and updating the station code to two.

In some aspects, the techniques described herein relate to a method, further including: transferring the data object to a third component; determining a third tracking stamp for the data object, the third tracking stamp including the record number; broadcasting the third tracking stamp to the channel; and updating the record to incorporate that the data object was received by the third component.

In some aspects, the techniques described herein relate to a method, further including: attempting to transfer the data object to a fourth component, wherein the data object does not transfer to the fourth component; upon a set interval of time occurring, applying a scan to the record tracking queue; finding a most recent entry of the record number in the record; identifying a most recent entry in the station queue array of the record, the most recent entry indicating the data object was most recently transferred to the second component; and transferring the data object to the fourth component.

In some aspects, the techniques described herein relate to a system for tracking a data object in a data pipeline, the system including: a memory having processor-readable instructions stored therein; and at least one processor configured to access the memory and execute the processor-readable instructions to perform operations including: receiving a data object from an data source, the data object indicating an occurrence of an information technology event; assigning a record number to the data object; determining a first tracking stamp for the data object, the first tracking stamp including the record number; broadcasting the first tracking stamp to a channel of a record tracking queue; initiating a record in the record tracking queue for the data object, the record including the record number, a station array, a station code, and a timestamp array, wherein the first tracking stamp updates the station array, station code, and timestamp array; transferring the data object to a second component; determining a second tracking stamp for the data object, the second tracking stamp including the record number; broadcasting the second tracking stamp to the channel; and updating the record with the second tracking stamp to indicate that the data object was received by the second component.

In some aspects, the techniques described herein relate to a system, wherein the first tracking stamp further includes a plurality of fields, the plurality of fields including: a record number field that includes the record number.

In some aspects, the techniques described herein relate to a system, wherein the plurality of fields further includes a first record queue field, a first record time entry field, and a first counter field, wherein the first record queue field records that the first tracking stamp was created at the collection point; wherein the first record time entry field records the time that the data objected was received by a collection point; and wherein the first counter field records what number interconnected component the first data object was received by.

In some aspects, the techniques described herein relate to a system, wherein the record is stored as a log file in the record tracking queue.

In some aspects, the techniques described herein relate to a system, wherein the updating the record to incorporate that the data object was received by the second component further includes: updating the station array to include a string listing the second component; updating the timestamp array to include a time the data objected was received by the second data object; and updating the station code to two.

In some aspects, the techniques described herein relate to a system, further including: transferring the data object to a third component; determining a third tracking stamp for the data object, the third tracking stamp including the record number; broadcasting the third tracking stamp to the channel; and updating the record to incorporate that the data object was received by the third component.

In some aspects, the techniques described herein relate to a system, further including: attempting to transfer the data object to a fourth component, wherein the data object does not transfer to the fourth component; upon a set interval of time occurring, applying a scan to the record tracking queue; finding a most recent entry of the record number in the record; identifying a most recent entry in the station queue array of the record, the most recent entry indicating the data object was most recently transferred to the second component; and transferring the data object to the fourth component.

In some aspects, the techniques described herein relate to a non-transitory computer readable medium configured to store processor-readable instructions which, when executed by at least one processor, cause the at least one processor to perform operations including: receiving a data object from an data source, the data object indicating an occurrence of an information technology event; assigning a record number to the data object; determining a first tracking stamp for the data object, the first tracking stamp including the record number; broadcasting the first tracking stamp to a channel of a record tracking queue; initiating a record in the record tracking queue for the data object, the record including the record number, a station array, a station code, and a timestamp array, wherein the first tracking stamp updates the station array, station code, and timestamp array; transferring the data object to a second component; determining a second tracking stamp for the data object, the second tracking stamp including the record number; broadcasting the second tracking stamp to the channel; and updating the record with the second tracking stamp to indicate that the data object was received by the second component.

In some aspects, the techniques described herein relate to a non-transitory computer readable medium, wherein the first tracking stamp further includes a plurality of fields, the plurality of fields including: a record number field that includes the record number.

In some aspects, the techniques described herein relate to a non-transitory computer readable medium, wherein the plurality of fields further includes a first record queue field, a first record time entry field, and a first counter field, wherein the first record queue field records that the first tracking stamp was created at a collection point; wherein the first record time entry field records the time that the data objected was received by the collection point; and wherein the first counter field records what number interconnected component the first data object was received by.

In some aspects, the techniques described herein relate to a non-transitory computer readable medium, wherein the updating the record to incorporate that the data object was received by the second component further includes: updating the station array to include a string listing the second component; updating the timestamp array to include a time the data objected was received by the second data object; and updating the station code to two.

In some aspects, the techniques described herein relate to a non-transitory computer readable medium, further including: transferring the data object to a third component; determining a third tracking stamp for the data object, the third tracking stamp including the record number; broadcasting the third tracking stamp to the channel; and updating the record to incorporate that the data object was received by the third component.

In some aspects, the techniques described herein relate to a non-transitory computer readable medium, further including: attempting to transfer the data object to a fourth component, wherein the data object does not transfer to the fourth component; upon a set interval of time occurring, applying a scan to the record tracking queue; finding a most recent entry of the record number in the record; identifying a most recent entry in the station queue array of the record, the most recent entry indicating the data object was most recently transferred to the second component; and transferring the data object to the fourth component.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and together with the description, serve to explain the principles of the disclosure.

FIG. 5 depicts an exemplary method for tracking a data object in a data pipeline, according to one or more embodiments.

DETAILED DESCRIPTION OF EMBODIMENTS

Figure 1:
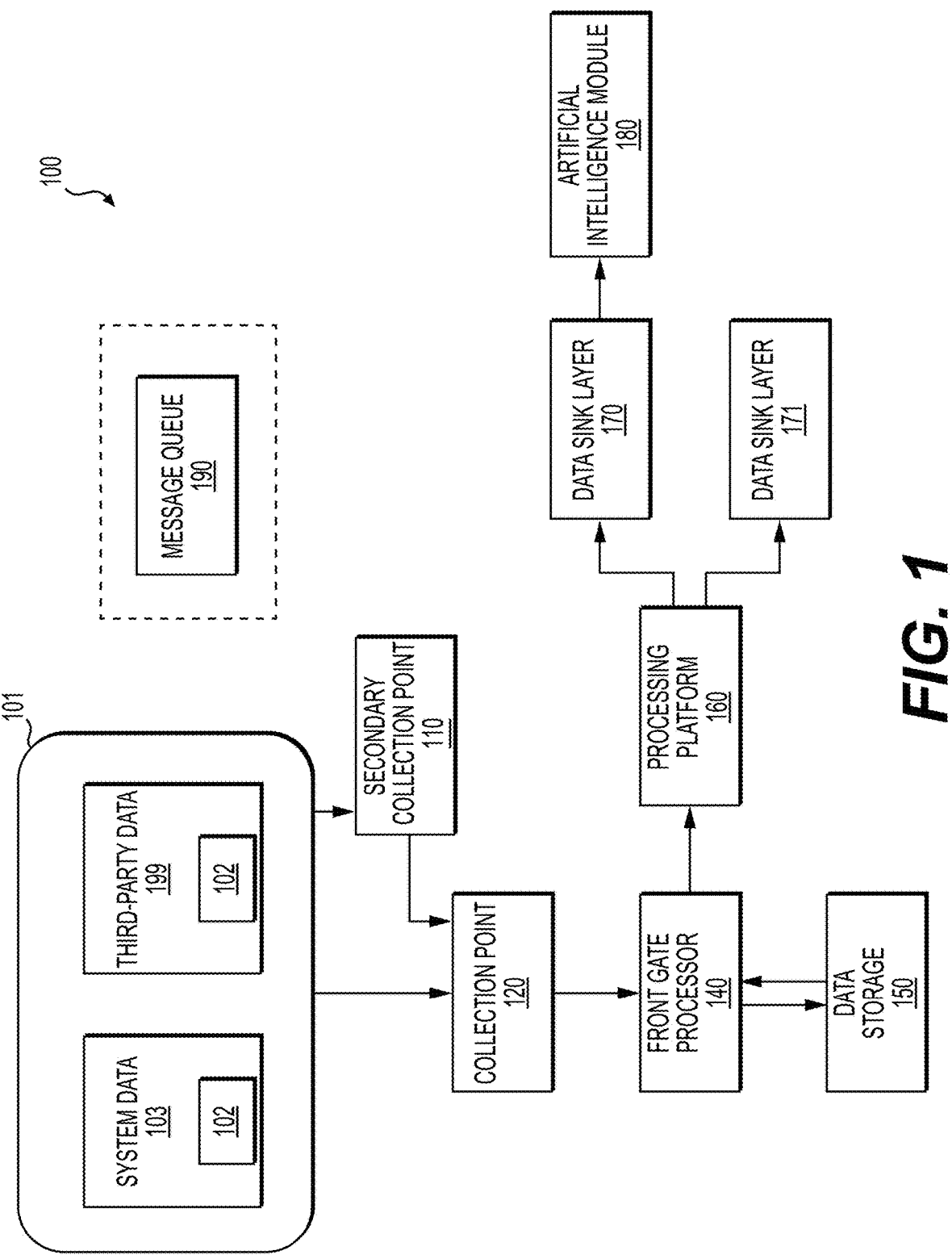
FIG. 1 depicts an exemplary system overview for a data pipeline for an artificial intelligence model to receive, process, analyze, and/or troubleshoot IT event data in a system, according to one or more embodiments.

Various embodiments of the present disclosure relate generally to information technology (IT) management systems and, more particularly, to systems and methods for tracking of data records and imputation of missing records.

The subject matter of the present disclosure will now be described more fully with reference to the accompanying drawings that show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment, and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Software companies have been struggling to avoid outages from incidents that may be caused by upgrading software or hardware components, or changing a member of a team, for example. The system described herein may be configured to analyze and/or process event data for an Information Technology (IT) system. The system described herein may, for example receive a stream of event data over periods of time and/or set of batch data. This event data may further be described as IT event data. Event data may include, but is not limited: (1) an incident, (2) an alert, (3) change data, (4) a problem, and/or (5) an anomaly.

An incident may be an occurrence that can disrupt or cause a loss of operation, services, or functions of a system. Incidents may be manually reported by customers or personnel, may be automatically logged by internal systems, or may be captured in other ways. An incident may occur from factors such as hardware failure, software failure, software bugs, human error, and/or cyber attacks. Deploying, refactoring, or releasing software code may, for example, cause an incident. An incident may be detected during, for example, an outage or a performance change. An incident may include characteristics, where an incident characteristic may refer to the quality or traits associated with an incident. For example, incident characteristics may include, but are not limited to, the severity of an incident, the urgency of an incident, the complexity of an incident, the scope of an incident, the cause of an incident, and/or what configurable item corresponds to the incident (e.g., what systems/platforms/products etc. are affected by the incident), how it is described in freeform text, what business segment is effected, what category/subcategory is affected, and/or what assigned group is the incident.

An alert may refer to a notification that informs a system or user of an event. An alert may include a collection of events representing a deviation from normal behavior for a system. For example, an alert may include metadata including a short field description that includes free from text fields (e.g., a summary of the alert), first occurrences, time stamps, an alert key, etc. Understanding the different types of alerts within a system from various perspectives may assist in resolving incidents.

Change data may refer to information that describes a modification made to data within a system or database. Change data may track the changes that occur over one or more periods of time. Problem data may refer to any data that causes issues or impedes a systems normal operations. Anomaly data may refer to data that indicates a deviation of a system from a standard or normal operation.

The event data may further include entities effected by the event and their respective relationships. Event data may be associated with one or more configurable items (CIs). A configurable item (CI) may refer a component of a system that can be identified as a self-contained unit for purposes of change control and identification. For example, a particular application, service, particular product, server, may be defined by a CI.

Processing a vast amount of information, such as IT events, to produce meaningful and actionable insights in IT operations may be valuable to organizations. As IT management systems utilize sophisticated tools and sensors, billions of data points may be received, and information overload may become an issue to be resolved. It may become challenging to track the progress of data flowing through a system. Further, it may be even more challenging to efficiently retrieve data that is lost when traveling through a system.

For example, inadequate monitoring and alerting mechanisms may pose challenges in promptly identifying issues within a data pipeline. Without timely notifications, it may become difficult to address problems promptly and to minimize their impact on downstream processes.

When ingesting data from pre-processing and/or a front gate processor (e.g., a system configured to perform ETL (Extract, Transform, Load)) into a processing module in a data pipeline, there are several potential issues that can impact data loss and data integrity. These issues can arise due to a variety of factors, including data format mismatches, network failures, and system errors.

Data loss may refer to the situation where data (e.g., data objects) expected to be ingested into a particular component or module, but does not arrive into the respective topic of the module. This can occur due to several factors such as network failures, system errors or misconfiguration of the ETL tools. Data loss can cause significant problems for downstream applications that rely on the ingested data, as they may be missing critical information needed for analysis or decision-making.

Data integrity may refer to the accuracy and consistency of the ingested data as it transfers through a system. When data integrity is compromised, it can lead to incorrect analysis or decision-making. Data integrity issues can arise due to a variety of factors such as dirty data, schema mismatches, or data truncation. For instance, if a source system is producing data with a different schema than expected by the topic, the ingested data may be truncated or misinterpreted, which can lead to data integrity issues (e.g., failure of transfer of a data object between component of a data pipeline system).

While ingesting data from ETL tools into a processing module can be a powerful way to collect and process substantial amounts of data in real-time, it may be important to be aware of the potential issues that can impact data loss and data integrity.

One or more embodiments may implement data record tracking and imputation of missing data to help ensure that the data ingestion processes are reliable and accurate.

One or more embodiments may allow for the verification and tracking of data through the data pipeline described herein. The system may be configured to determine where along the data pipeline any data was lost. To ensure data integrity and prevent data loss, the data pipeline described herein may be configured to handle failures, such as network outages, system failures, or unavailability of data sources. The system may be configured to detect and resolve issues, ensuring smooth data flow throughout the pipeline.

One or more embodiments may allow for various types of data processing in order to identify correlations, similarity, and root causes, and recommend a corrective action based on received data as well as user feedback mechanisms. One or more embodiments may be extended to clients and users of services and software with applications that are connected to the system described herein.

FIG. 1 depicts an exemplary system overview for a data pipeline for an artificial intelligence model to receive, process, analyze, and/or troubleshoot IT event data in a system, according to one or more embodiments. The data pipeline system 100 may be a platform with multiple interconnected components. The data pipeline system 100 may include one or more servers, intelligent networking devices, computing devices, components, and corresponding software for aggregating and processing data.

As shown in FIG. 1, a data pipeline system 100 may include a data source 101, a collection point 120, a secondary collection point 110, a front gate processor 140, data storage 150, a processing platform 160, a data sink layer 170, a data sink layer 171, an artificial intelligence module 180, and a message queue.

The data source 101 may include in-house data 103 and third party data 199. The in-house data 103 may be a data source directly linked to the data pipeline system 100. Third party data 199 may be a data source connected to the data pipeline system 100 externally as will be described in greater detail below.

Both the in-house data 103 and third party data 199 of the data source 101 may include incident data 102. Incident data 102 may include incident reports with information for each incident provided with one or more of an incident number, closed date/time, category, close code, close note, long description, short description, root cause, or assignment group. Incident data 102 may include incident reports with information for each incident provided with one or more of an issue key, description, summary, label, issue type, fix version, environment, author, or comments. Incident data 102 may include incident reports with information for each incident provided with one or more of a file name, script name, script type, script description, display identifier, message, committer type, committer link, properties, file changes, or branch information. Incident data 102 may include one or more of real-time data, market data, performance data, historical data, utilization data, infrastructure data, or security data. These are merely examples of information that may be used as data, and the disclosure is not limited to these examples. The in-house data 103 and third party data 199 may further include IT event data, including anomaly data, change data, problem data, and alert data, along with corresponding metadata, which may be processed by the data pipeline system 100.

Incident data 102 may be generated automatically by monitoring tools that generate alerts and incident data to provide notification of high-risk actions, failures in IT environment, and may be generated as tickets. Incident data may include metadata, such as, for example, text fields, identifying codes, and time stamps.

The in-house data 103 may be stored in a relational database including an incident table. The incident table may be provided as one or more tables, and may include, for example, one or more of problems, tasks, risk conditions, incidents, or changes. The relational database may be stored in a cloud. The relational database may be connected through encryption to a gateway. The relational database may send and receive periodic updates to and from the cloud. The cloud may be a remote cloud service, a local service, or any combination thereof. The cloud may include a gateway connected to a processing API configured to transfer data to the collection point 120 or the secondary collection point 110. The incident table may include incident data 102.

Data pipeline system 100 may include third party data 199 generated and maintained by third party data producers. Third party data producers may produce incident data 102 from Internet of Things (IoT) devices, desktop-level devices, and sensors. Third party data producers may include but are not limited to Tryambak, Appneta, Oracle, Prognosis, ThousandEyes, Zabbix, ServiceNow, Density, Dyatrace, etc. The incident data 102 may include metadata indicating that the data belongs to a particular client or associated system. The third-party data 199 and the system data 102 may further be configured to transfer IT event data and all corresponding metadata from the data source to the collection point 120.

The data pipeline system 100 may include the secondary collection point 110 to collect and pre-process incident data 102 from the data source 101. The secondary collection point 110 may be utilized prior to transferring data to the collection point 120. The secondary collection point 110 point may for example be an Apache Minifi software. In one example, the secondary collection point 110 may run on a microprocessor for a third party data producer. Each third party data producer may have an instance of the secondary collection point 110 running on a microprocessor. The secondary collection point 110 may support data formats including but not limited to JSON, CSV, Avro, ORC, HTML, XML, and Parquet. The secondary collection point 110 may encrypt incident data 102 collected from the third party data producers. The secondary collection point 110 may encrypt incident data, including, but not limited to, Mutual Authentication Transport Layer Security (mTLS), HTTPs, SSH, PGP, IPsec, and SSL. The secondary collection point 110 may perform initial transformation or processing of incident data 102. The secondary collection point 110 may be configured to collect data from a variety of protocols, have data provenance generated immediately, apply transformations and encryptions on the data, and prioritize data.

The data pipeline system 100 may include the collection point 120. The collection point 120 may be a system configured to provide a secure framework for routing, transforming, and delivering data across from the data source 101 to downstream processing devices (e.g., the front gate processor 140). The collection point 120 may for example be a software such as Apache NiFi. The collection point 120 may receive raw data and the data's corresponding fields such as the source name and ingestion time. The collection point 120 may run on a Linux Virtual Machine (VM) on a remote server. The collection point 120 may include one or more nodes. For example, the collection point 120 may receive incident data 102 directly from the data source 101. In another example, the collection point 120 may receive incident data 102 from the secondary collection point 110. The secondary collection point 110 may transfer the incident data 102 to the collection point 120 using, for example, Site-to-Site protocol. The collection point 120 may include a flow algorithm. The flow algorithm may connect different processors, as described herein, to transfer and modify data from one source to another. For each third party data producer, the collection point 120 may have a separate flow algorithm. Each flow algorithm may include a processing group. The processing group may include one or more processors. The one or more processors may, for example, fetch incident data 102 from the relational database. The one or more processors may utilize the processing API of the in-house data 103 to make an API call to a relational database to fetch incident data 102 from the incident table. The one or more processors may further transfer incident data 102 to a destination system such as a front gate processor 140. The collection point 120 may encrypt data through HTTPS, Mutual Authentication Transport Layer Security (mTLS), SSH, PGP, IPsec, and/or SSL, etc. The collection point 120 may support data formats including but not limited to JSON, CSV, Avro, ORC, HTML, XML, and Parquet. The collection point 120 may be configured to write messages to clusters of a front gate processor 140 and communication with the front gate processor 140. The collection point 120 may be configured to assign a particular identifier (e.g., a record number) to each received data object from the data source 101.

The data pipeline system 100 may include a distributed event streaming platform such as the front gate processor 140. The front gate processor 140 may be connected to and configured to receive data from the collection point 120. The front gate processor 140 may be implemented in an Apache Kafka cluster software system. The front gate processor 140 may include one or more message brokers and corresponding nodes. The message broker may for example be an intermediary computer program module that translates a message from the formal messaging protocol of the sender to the formal messaging protocol of the receiver. The message broker may be on a single node in the front gate processor 140. A message broker of the front gate processor 140 may run on a virtual machine (VM) on a remote server. The collection point 120 may send the incident data 102 to one or more of the message brokers of the front gate processor 140. Each message broker may include a topic to store similar categories of incident data 102. A topic may be an ordered log of events. Each topic may include one or more sub-topics. For example, one sub-topic may store incident data 102 relating to network problems and another topic may store incident data 102 related to security breaches from third party data producers. Each topic may further include one or more partitions. The partitions may be a systematic way of breaking the one topic log file into many logs, each of which can be hosted on a separate server. Each partition may be configured to store as much as a byte of incident data 102. Each topic may be partitioned evenly between one or more message brokers to achieve load balancing and scalability. The front gate processor 140 may be configured to categorize the received data into a plurality of client categories, thereby forming a plurality of datasets associated with the respective client categories. These datasets may be stored separately within the storage device as described in greater detail below. The front gate processor 140 may further transfer data to storage and to processors for further processing.

For example, the front gate processor 140 may be configured to assign particular data to a corresponding topic. Alert sources may be assigned to an alert topic, and incident data may be assigned to an incident topic. Change data may be assigned to a change topic. Problem data may be assigned to a problem topic.

The data pipeline system 100 may include a software framework for data storage 150. The data storage 150 may be configured for long term storage and distributed processing. The data storage 150 may be implemented using, for example, Apache Hadoop. The data storage 150 may store incident data 102 transferred from the front gate processor 140. In particular, data storage 150 may be utilized for distributed processing of incident data 102, and Hadoop distributed file system (HDFS) within the data storage may be used for organizing communications and storage of incident data 102. For example, the HDFS may replicate any node from the front gate processor 140. This replication may protect against hardware or software failures of the front gate processor 140. The processing may be performed in parallel on multiple servers simultaneously.

The data storage 150 may include an HDFS that is configured to receive the metadata (e.g., incident data). The data storage 150 may further process the data utilizing a MapReduce algorithm. The MapReduce algorithm may allow for parallel processing of large data sets. The data storage 150 may further aggregate and store the data utilizing Yet Another Resource Negotiation (YARN). YARN may be used for cluster resource management and planning tasks of the stored data. For example, a cluster computing framework, such as the processing platform 160, may be arranged to further utilize the HDFS of the data storage 150. For example, if the data source 101 stops providing data, the processing platform 160 may be configured to retrieve data from the data storage 150 either directly or through the front gate processor 140. The data storage 150 may allow for the distributed processing of large data sets across clusters of computers using programming models. The data storage 150 may include a master node and an HDFS for distributing processing across a plurality of data nodes. The master node may store metadata such as the number of blocks and their locations. The main node may maintain the file system namespace and regulate client access to said files. The main node may comprise files and directories and perform file system executions such as naming, closing, and opening files. The data storage 150 may scale up from a single server to thousands of machines, each offering local computation and storage. The data storage 150 may be configured to store the incident data in an unstructured, semi-structured, or structured form. In one example, the plurality of datasets associated with the respective client categories may be stored separately. The master node may store the metadata such as the separate dataset locations.

The data pipeline system 100 may include a real-time processing framework, e.g., a processing platform 160. In one example, the processing platform 160 may be a distributed dataflow engine that does not have its own storage layer. For example, this may be the software platform Apache Flink. In another example, the software platform Apache Spark may be utilized. The processing platform 160 may support stream processing and batch processing. Stream processing may be a type of data processing that performs continuous, real-time analysis of received data. Batch processing may involve receiving discrete data sets processed in batches. The processing platform 160 may include one or more nodes. The processing platform 160 may aggregate incident data 102 (e.g., incident data 102 that has been processed by the front gate processor 140) received from the front gate processor 140. The processing platform 160 may include one or more operators to transform and process the received data. For example, a single operator may filter the incident data 102 and then connect to another operator to perform further data transformation. The processing platform 160 may process incident data 102 in parallel. A single operator may be on a single node within the processing platform 160. The processing platform 160 may be configured to filter and only send particular processed data to a particular data sink layer. For example, depending on the data source of the incident data 102 (e.g., whether the data is in-house data 103 or third party data 199), the data may be transferred to a separate data sink layer (e.g., data sink layer 170, or data sink layer 171). Further, additional data that is not required at downstream modules (e.g., at the artificial intelligence module 180) may be filtered and excluded prior to transferring the data to a data sink layer.

The processing platform 160 may perform three functions. First, the processing platform 160 may perform data validation. The data's value, structure, and/or format may be matched with the schema of the destination (e.g., the data sink layer 170). Second, the processing platform 160 may perform a data transformation. For example, a source field, target field, function, and parameter from the data may be extracted. Based upon the extracted function of the data, a particular transformation may be applied. The transformation may reformat the data for a particular use downstream. A user may be able to select a particular format for downstream use. Third, the processing platform 160 may perform data routing. For example, the processing platform 160 may select the shortest and/or most reliable path to send data to a respective sink layer (e.g., sink layer 170 and/or sink layer 171).

In one example, the processing platform 160 may be configured to transfer particular sets of data to a data sink layer. For example, the processing platform 160 may receive input variables for a particular artificial intelligence module

180. The processing platform 160 may then filter the data received from the front gate processor 140 and only transfer data related to the input variables of the artificial intelligence module 180 to a data sink layer.

The data pipeline system 100 may include one or more data sink layers (e.g., a data sink layer 170 and a data sink layer 171). Incident data 102 processed from processing platform 160 may be transmitted to and stored in the data sink layer 170. In one example, the data sink layer 171 may be stored externally on a particular client's server. The data sink layer 170 and the data sink layer 171 may be implemented using a software such as, but not limited to, PostgreSQL, HIVE, Kafka, OpenSearch, and Neo4j. The data sink layer 170 may receive in-house data 103, which have been processed and received from the processing platform 160. The data sink layer 171 may receive third party data 199, which have been processed and received from the processing platform 160. The data sink layers may be configured to transfer incident data 102 to an artificial intelligence module 180. The data sink layers may be data lakes, data warehouses, or cloud storage systems. Each data sink layer may be configured to store incident data 102 in both a structured or unstructured format. The data sink layer 170 may store incident data 102 with several different formats. For example, the data sink layer 170 may support data formats such as JavaScript Objection Notation (JSON), comma-separated value (CSV), Avro, Optimized Row Columnar (ORC), Hypertext Markup Language (HTML), Extensible Markup Language (XML), or Parquet, etc. The data sink layer (e.g., the data sink layer 170 or the data sink layer 171), may be accessed by one or more separate components. For example, the data sink layer may be accessed by a Non-structured Query language ("NoSQL") database management system (e.g., a Cassandra cluster), a graph database management system (e.g., Neo4j cluster), further processing programs (e.g., Kafka+Flink programs), and a relation database management system (e.g., postgres cluster). Further processing may thus be performed prior to the processed data being received by an artificial intelligence module 180.

The data pipeline system 100 may include an artificial intelligence module 180. The artificial intelligence module 180 may include a machine-learning component. The artificial intelligence module 180 may use the received data in order to train and/or use a machine learning model. The machine learning model may be, for example, a neural network. Nonetheless, it should be noted that other machine learning techniques and frameworks may be used by the artificial intelligence module 180 to perform the methods contemplated by the present disclosure. For example, the systems and methods may be realized using other types of supervised and unsupervised machine learning techniques such as regression problems, random forest, cluster algorithms, principal component analysis (PCA), reinforcement learning, or a combination thereof. The artificial intelligence module 180 may be configured to extract and receive data from the data sink layer 170.

The data pipeline system 100 may further include a message queue 190. The message queue 190 may be configured to organize and distribute data to one or more components of the data pipeline system 100. The message queue 190 may further be configured to initiate a record tracking queue for one or more data objects and to assist with tracking data objects that travel through the data pipeline system 100.

The message queue 190 may be implemented by Kafka software. The message queue 190 may include one or more respective topics. In some examples, the message queue 190 may include topics for each type of data output by each connected external source. For example, the message queue 190 may include connectors configured to read and extract log files from the collection point 120 to update the message queue 190. The message queue 190 may include one or more brokers that are responsible for storing and managing topics and their respective partitions. The brokers may further handle the reception, storage, and forwarding of messages received from the connector. The message queue 190 may be, although not shown in FIG. 1, interconnected with all components of the data pipeline system 100 (e.g., the collection point 120, the front gate processor 140, the data storage 150, the processing platform 160, the data sink layer 170, the artificial intelligence module 180, etc.).

The message queue 190 may include a record tracking queue. The record tracking queue may be implemented by a topic of Kafka and may also be referred to as a record tracking topic. Every time a new data object is received by the collection point 120, the collection point may transfer a tracking stamp to the message queue 190 and the message queue 190 may generate a record related to the received data object. The record may include a record number, a station array, a station code, and a timestamp array. The record may be a log file that is stored in the record tracking queue. A record may include a recorded number assigned to each data object at the collection point 120. A station array may refer to an array that lists strings of component names in an array, as the data object passes from one component to another. For example, a data object that has passed through three components may have an assigned station array of: [first component, second component, third component], where each time the record passes through a new component, the component name is added to the station array. The station code may refer to a field that represents a counter for how many components a data object has passed through. For example, when a record is created, the station code may be set to 1. Each time a new component receives the data object, the station code value may be increased by one. The timestamp array, may be an array of timestamps, wherein each timestamp value in the array lists a particular time a component received the data object. Each time a data object travels through a new component of the data pipeline system 100, a new time value may be added to the array indicating what time the data object was received by the new component.

Each component of the data pipeline system 100 (e.g., the collection point 120, the front gate processor 140, the data storage 150, the processing platform 160, the data sink layer 170, the artificial intelligence module 180, etc.) may be configured create tracking stamps and transfer the tracking stamps to the message queue 190 by broadcasting the tracking stamp to the message queue 190. The tracking stamps may include the data to access and update the respective record for a data object stored in the record tracking queue. Each time stamp may include the record number of a data object, a record queue field, a record time entry field, and a counter field. The record queue field may be a string of the respective component name that created the tracking stamp. The record time entry field may indicate the time that the data object was received by the respective component. The record time entry field may include a Unix timestamp, which includes a day, month, year, and time described as a single number. For example, the Unix timestamp may be in the value of seconds or milliseconds. The counter field may be an integer that represent how many components a data object has passed through. For example, a data object that has only passed through the collection point 120 and front gate processor 140, may have a counter field value of two.

When the message queue 190 receives a broadcast of a timestamp, the message queue 190 may be configured to search the message queue 190 for the record number of the timestamp. If a record number is not found, a new record may be created. If a record is found, the timestamp may be utilized to update that record. Updating the record with the time stamp may include, the station array adding the record queue field to a new entry in the array. Updating the record with the time stamp may further include, updating the station code counter number by one. Updating the record with the time stamp may further include, updating the timestamp array to include the record time entry filed as a new entry in the timestamp array. Each time a timestamp is received by the record queue of the message queue with a record number, a record may either be created or updated by the timestamp.

The data pipeline system 100 may further have additional components and servers not displayed in FIG. 1. For example, the data pipeline system 100 may include be one or more components configured to perform extraction, transformation, and loading. The Front gate processor 140 may be connected to a retention layer that may ensure that data objects are stored for required amounts of time prior to being deleted or achieved in storage. Each of these components may also be configured to generate and output timestamps to the message queue 190 of the data pipeline system 100.

Tracking of Data Records and Imputation of Missing Record in a Deep Data Engineering Pipeline:

A data object, representing an IT event, in a data pipeline system (e.g., the data pipeline system 100) may need to be identified prior to and as a system processes and/or analyzed the data object. Data objects received by the data pipeline may appear similar and use similar types of fields internally that may be ambiguous. This may make it difficult for data pipelines to trace and keep track of data objects flowing through a data pipeline system.

The system described herein may be configured to, for every data object flowing into the data pipeline (e.g., through data source 101), to track the data object utilizing a unique record number and record stamp(s) that may be associated with the data object as the data object enters and moves through the data pipeline. This unique record number may be associated with the data as it flows through the various processors, components, and/or layers of the data pipeline described herein, and the data pipeline may create tracking stamps for the data object as it flows through the data pipeline.

Figure 2:
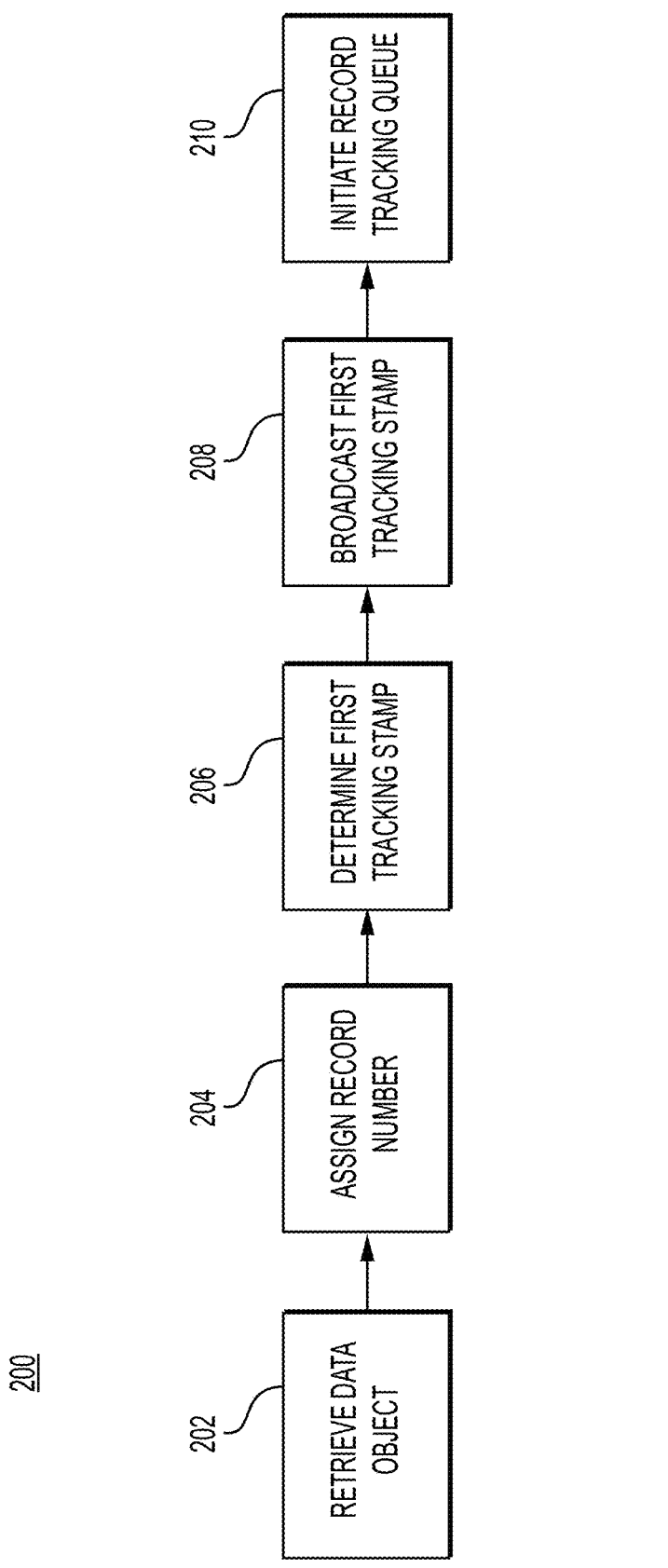
FIG. 2 depicts an exemplary flowchart of a process for initiating a record tracking queue in a message queue, according to one or more embodiments.

FIG. 2 depicts an exemplary flowchart 200 of a process for initiating a record tracking queue in a message queue, according to one or more embodiments. FIG. 2 may be implemented by aspects of the data pipeline system 100 of FIG. 1.

At step 202, the system (e.g., the collection point 120) may be configured to receive a data object from an external data source (e.g., the data source 101) by a first component (e.g., the collection point 120). The external data object may represent the occurrence of an information technology event. For example, the information technology event may be an incident, alert, problem, change, or anomaly. Further, the data object may include metadata associated with the data object. An exemplary data object with corresponding metadata may be displayed below. In the example below, the data object may be an alert data object.

```
{
    "MasterClass" : "Storage",
    "DC" : "ABCD",
    "devicename" : "ukbd-pm-abc01",
    "SerialNumber" : "JPG252400Q0",
    "IP" : "10.111.11.111",
     "Vendor": "XYZ",
    "Model" : "XYZ MDS 8000 Series Multilayer 9396T",
     "IsAnAsset" : "Yes",
    "AssetTag" : "FIS20000",
    "ClusterName" : "",
    "HashTag" : "",
    "StormClass" : "",
    "LastUpdated" : "2022-04-01T15:53:05.212Z",
    "createdAt" : "2022-04-01T07:21:39.973Z",
    "updatedAt" : "2022-04-01T15:53:05.215Z",
    "id" : "6246a7fdf0ca770e1c4afb06",
    "origin_of_capture" : "storm",
    "nifi_ingest_timestamp_utc" : "2023-11-17 11:23:44",
}
```

At step 204, the system (e.g., the collection point 120) may assign a record number to the data object. The record number may identify the external source and include a string of integers and numbers. The record number may be configured to identify the data object as obtained from the respective source the data object was received from. For example, the record number may be created based on metadata associated with the data object. For example, the record number may be made of an assigned identifier and a name of an external source that supplied the data object, connected by an underscore. An exemplary record number for the data object above may be "69630327-c54f-4d7f-8f79-2db014cbade5_1700220224455_storm."

At step 206, the first component (e.g., the collection point 120) may determine a first tracking stamp for the data object. The first tracking stamp may include a plurality of fields. The plurality of fields of the first tracking stamp may include the record number from step 204. The plurality of fields of the first tracking stamp may also include a record queue field, a record time entry field, and a counter field. The record queue field may be a string describing the component that received the data object (e.g., the name of the collection point 120). The record time entry field may indicate the time that the data object was received by the first component. The record time entry may be in a Unix timestamp value. The counter field may be assigned a value of one, indicating that this is the first component in the system to receive the data object. An exemplary first time stamp may be shown in table 1, below.

TABLE 1

| Field | Value |
|---|---|
| "record_queue" | ": [ "nifi"], |
| "record_time_entry" | [ 1698220609354], |
| "counter" | 1 |
| "record_no" | "96f47bc4-bc12-4b20-84fa-3f312ddaa4c5_1698220609354_storm" |

At step 208, the first component (e.g., the collection point 120) may broadcast the first tracking stamp to a channel of message queue (e.g., the message queue 190) of the system (e.g., the data pipeline system 100). The message queue may include a record tracking queue, where the record tracking queue is a particular topic of the message queue.

At step 210, the system (e.g., the message queue 190) may, upon receiving the first tracking stamp, run a search of the record tracking queue for the tracking stamp's record number. Upon not finding an existing record in the record tracking queue, the message queue may create a record in the record tracking queue. The record may be a log file that includes the record number, a station array, a station code, and a timestamp array. The fields from the first tracking stamp may populate the record. For example, the station array may include the first record queue field. The station code may include the counter field. The timestamp array may include the record time entry field.

Figure 3:
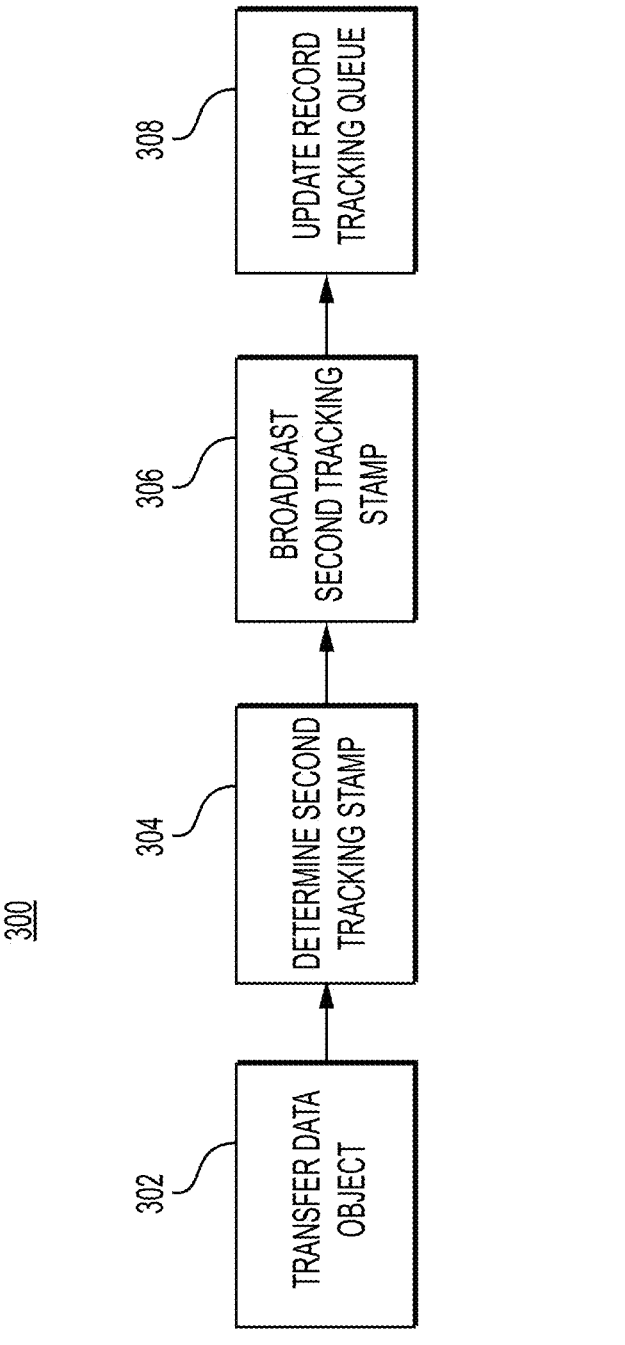
FIG. 3 depicts an exemplary flowchart of a process for updating a record tracking queue, according to one or more embodiments.

Upon the completion of the method of FIG. 2, a data object may be recorded in a tracking queue of the data system pipeline. Next, the data object may, based on the data system pipeline, travel to various components of the system. When the data object travels from one component to another, additional time tracking stamps for each time the data object enters a new component may be created. FIG. 3 describes the process for updating the record of the data object in the tracking queue as the data object moves from one component to another. The method of FIG. 3 may be applied each time to a single data object transfers components in a data pipeline system.

FIG. 3 depicts an exemplary flowchart 300 of a process for updating a record tracking queue, according to one or more embodiments. FIG. 3 may be implemented by aspects of the data pipeline system 100 of FIG. 1.

At step 302, a data object may be transferred from a first component to a second component. In an example scenario the first component may be the collection point 120 and the second component may be the front gate processor 140 of FIG. 1. The first component and second component may represent any two components of the data pipeline system 100 that a data object travels between.

At step 304, the second component may determine a second tracking stamp for the data object. The second tracking stamp may include the data object record number. The second tracking stamp may further include additional fields such as a record queue field, a record time entry field, and a counter field. The record queue field may be a string describing the component that received the data object (e.g., the second component). The record time entry field may indicate the time that the data object was received by the second component. The record time entry may be in a Unix timestamp value. The counter field may be assigned a value of two, indicating that this is the second component in the system to receive the data object. The counter field may represent a number of how many times a data object has been transferred. If the process of FIG. 3 was being applied for a fourth transfer, the counter field would be updated to a value of 4. An exemplary second time stamp may be shown in table 2, below.

TABLE 2

| Field | Value |
|---|---|
| "record_queue" | ": ["kafka"], |
| "record_time_entry" | [1698220610965], |
| "counter" | 2 |
| "record_no" | "96f47bc4-bc12-4b20-84fa-3f312ddaa4c5_1698220609354_storm" |

At step 306, the second tracking stamp may be broadcast to the record queue of the message queue (e.g., the message queue 190).

At step 308, the message queue may query the record queue for a matching record that includes the record number of the second tracking stamp. When looking for a matching record in the record queue, the message queue may take the latest offset at the time the data object was received and may start to look from the beginning of the topic and reads all the records until it reaches the current offset (e.g., the record number). The current offset may be the position of the last record that was read by the message queue. This method may determine the matching record in the record tracking queue.

Further, at step 308, upon finding the record with the matching record number, the record may be updated to include information from the fields of the second time stamp. In some examples, updating a record may include creating a new log file that incorporates all information from the record determined at step 306 and incorporates new information of the second time stamp to store as a new record in the record tracking queue. For example, updating the record may include extracting all fields from the determined record of step 306 and updating the fields as follows. For the updated record, the station array may be updated to include an entry from the record queue field. The station code may be updated to include the counter field. The timestamp array may be updated to include an entry from the record time entry field. Table three below shows an exemplary record updated after step 308 was applied. The exemplary record may represent a record upon a data object being transferred from a first component (e.g., the collection point 120) to a second component (e.g. the front gate processors 14).

TABLE 3

| Field | Value |
|---|---|
| "station array" | : [""nifi","kafka"] |
| "time stamp array" | [1698220609354, 1698220610965], |
| "station code" | 2 |
| "record_no" | "96f47bc4-bc12-4b20-84fa-3f312ddaa4c5_1698220609354_storm" |

The method of FIG. 3 may be applied each time the data object transfers between components of the data pipeline system 100.

Figure 4:
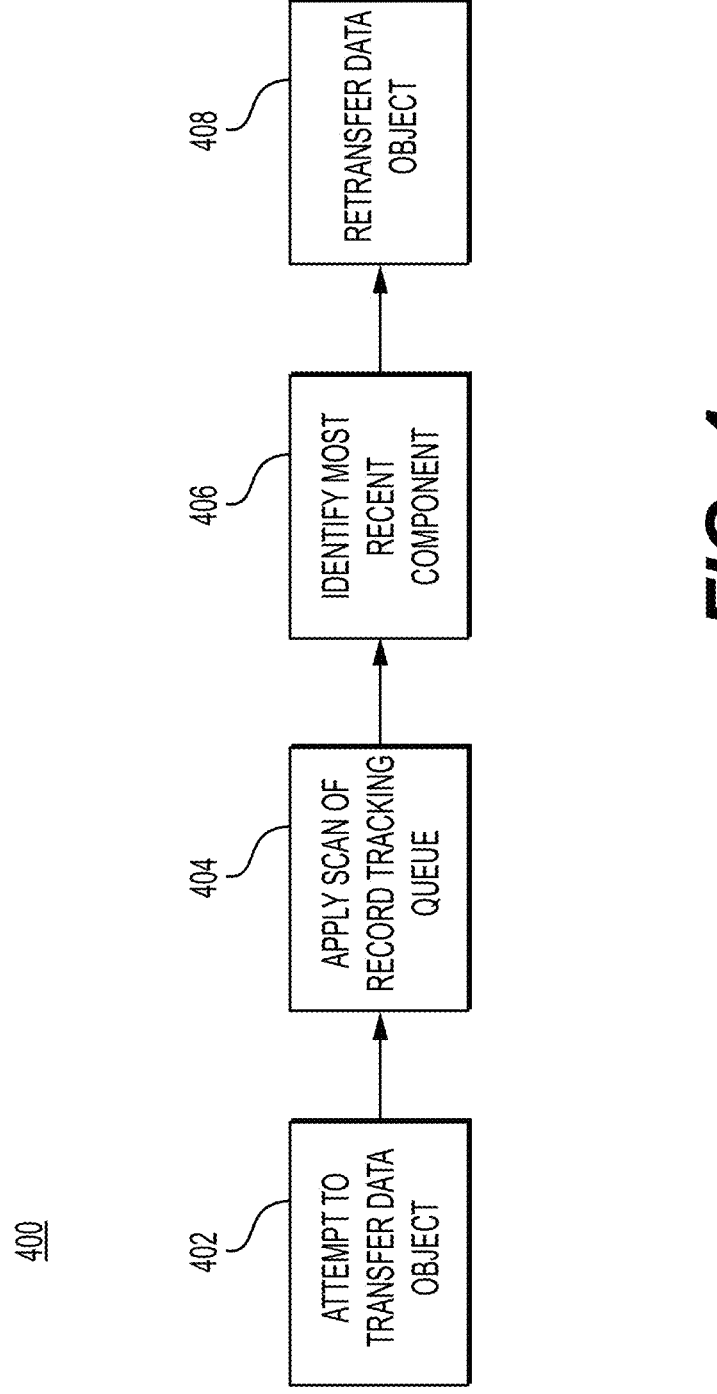
FIG. 4 depicts an exemplary flowchart of a process for retransferring a data object after an unsuccessful transfer, according to one or more embodiments.

The system described herein (e.g., the data pipeline system 100) may be configured to determine when a data object is lost when traveling through the data pipeline. Further, the system may be configured to extract a data object from a last known component when a data object is lost. In some cases, it may not be feasible to the system to go back to the source to fetch a lost data object, as some data source may not allow this. FIG. 4, described below, may describe the process for the data pipeline identifying, extracting, and retransferring data objects that are lost in the system.

FIG. 4 depicts an exemplary flowchart of a process for retransferring a data object after an unsuccessful transfer, according to one or more embodiments. FIG. 4 may be implemented by aspects of the data pipeline system 100 of FIG. 1.

At step 402, a data object may attempt to transfer from a second component to a third component. In an exemplary scenario, the second component may be the front gate processor 140 and the third component may be the processing platform 160. In some examples, the message queue (e.g., message queue 190) may be configured to direct the flow of the data objects from one component to another in the data pipeline system. Thus, based on an output from the message queue, the data object may be sent from a second component to a third component. While being transferred from the second component to the third component, an issue may occur causing the data object to not successfully transfer to the third component. The issue that caused a data object to not transfer correctly may include, but is not limited to, schema mismatch with the data object, data integrity issues, connection issues, authentication or authorization failure, component misconfiguration, incompatible versions, data format issues, resource limitations, and/or data encoding/decoding issues. The method of FIG. 4 may be applied whenever the data object unsuccessfully travels between any of the components of FIG. 1. At step 402, the data object may not successfully transfer to the third component.

At step 404, the data pipeline system (e.g., the data pipeline system 100) may apply a scan to the record tracking queue. For example, after the second component attempts to transfer the data object to the third component, an automatic scan may be applied after a set interval of time to confirm that the data object successfully transferred to the third object. For example, each time a data object is sent from one component to another, the scan may be applied to the message queue. The set interval of time may be 1 millisecond, 5 milliseconds, or 10 milliseconds after an attempted transfer.

At step 406, the message queue may apply the techniques of step 308 to query the record tracking queue and search for the record number associated with the data object from step 402. The step may then include reading the record that includes the record number and identifying (e.g., from the station array or station code), that the third component fields are not stored in the record. Based on this, the system may determine that the data object did not successfully transfer to the third component. Based on the record, the data object may identify where the data object was lasted located (e.g., the second component).

At step 408, the system (e.g., the data pipeline system 100), upon identifying that the data object did not successfully transfer to the third component, may retransfer the data object from the second component to the third component. The data may thus be resent from the second component, rather than the data source, to the third component. By not extracting the data object from the source, but rather a most recent component, the system may retransfer the data object quicker and more efficiently (e.g., as an any previous processing on the data object may be retained).

In some examples, the second component may not keep a record of a data object upon unsuccessful transfer. The message queue may then be configured to extract the data object from data storage (e.g., data storage 150) within the data pipeline system. For example, the system described herein may be configured to archive copy of data objects in the archive layer along with the record identifier, which may help the system uniquely identify the record in case required.

This archive storage may also be accessed in relational form through HBase/HIVE systems if required to read only target records. In another example, the system can directly read the data object from storage & send it back to the third component.

FIG. 5 depicts a method for tracking a data object in a data pipeline, according to one or more embodiments. FIG. 5 may be implemented by aspects of the data pipeline system 100 of FIG. 1.

Step 502 may include receiving a data object from an data source, the data object indicating an occurrence of an information technology event.

Step 504 may include assigning a record number to the data object.

Step 506 determining a first tracking stamp for the data object, the first tracking stamp including the record number. The first tracking stamp may further include a plurality of fields, the plurality of fields including a record number field that includes the record number. The plurality of fields may further include a first record queue field, a first record time entry field, and a first counter field, wherein the first record queue field records that the first tracking stamp was created at the collection point; wherein the first record time entry field records the time that the data objected was received by the collection point; and wherein the first counter field records what number interconnected component the first data object was received by.

Step 508 may include broadcasting the first tracking stamp to a channel of a record tracking queue.

Step 510 may include initiating a record in the record tracking queue for the data object, the record including the record number, a station array, a station code, and a time-stamp array, wherein the first tracking stamp updates the station array, station code, and timestamp array. The record may be stored as a log file in the record tracking queue.

Step 512 may include transferring the data object to a second component and determining a second tracking stamp for the data object, the second tracking stamp including the record number.

Step 514 may include broadcasting the second tracking stamp to the channel.

Step 516 may include updating the record with the second tracking stamp to indicate that the data object was received by the second component. This may include updating the station array to include a string listing the second compo-nent; updating the timestamp array to include a time the data objected was received by the second data object; and updat-ing the station code to two.

The method may further include transferring the data object to a third component; determining a third tracking stamp for the data object, the third tracking stamp including the record number; broadcasting the third tracking stamp to the channel; and updating the record to incorporate that the data object was received by the third component.

The method may further include attempting to transfer the data object to a fourth component, wherein the data object does not transfer to the fourth component; upon a set interval of time occurring, applying a scan to the record tracking queue; finding a most recent entry of the record number in the record; identifying a most recent entry in the station queue array of the record, the most recent entry indicating the data object was most recently transferred to the second component; transferring the data object to the fourth com-ponent.

The methods described in FIG. 2-FIG. 5 may take place within the data pipeline system 100 of FIG. 1 simultane-ously. For example, the data pipeline system 100 may have hundreds or thousands of data objects flowing through the various components, and the methods described in FIG. 2-FIG. 5 may constantly occur for each of the data objects flowing through the pipeline. For example, if multiple data objects are received by the collection point 120 at the same time, then the method of FIG. 2 may be applied concurrently for each of the data objects received.

Figure 6:
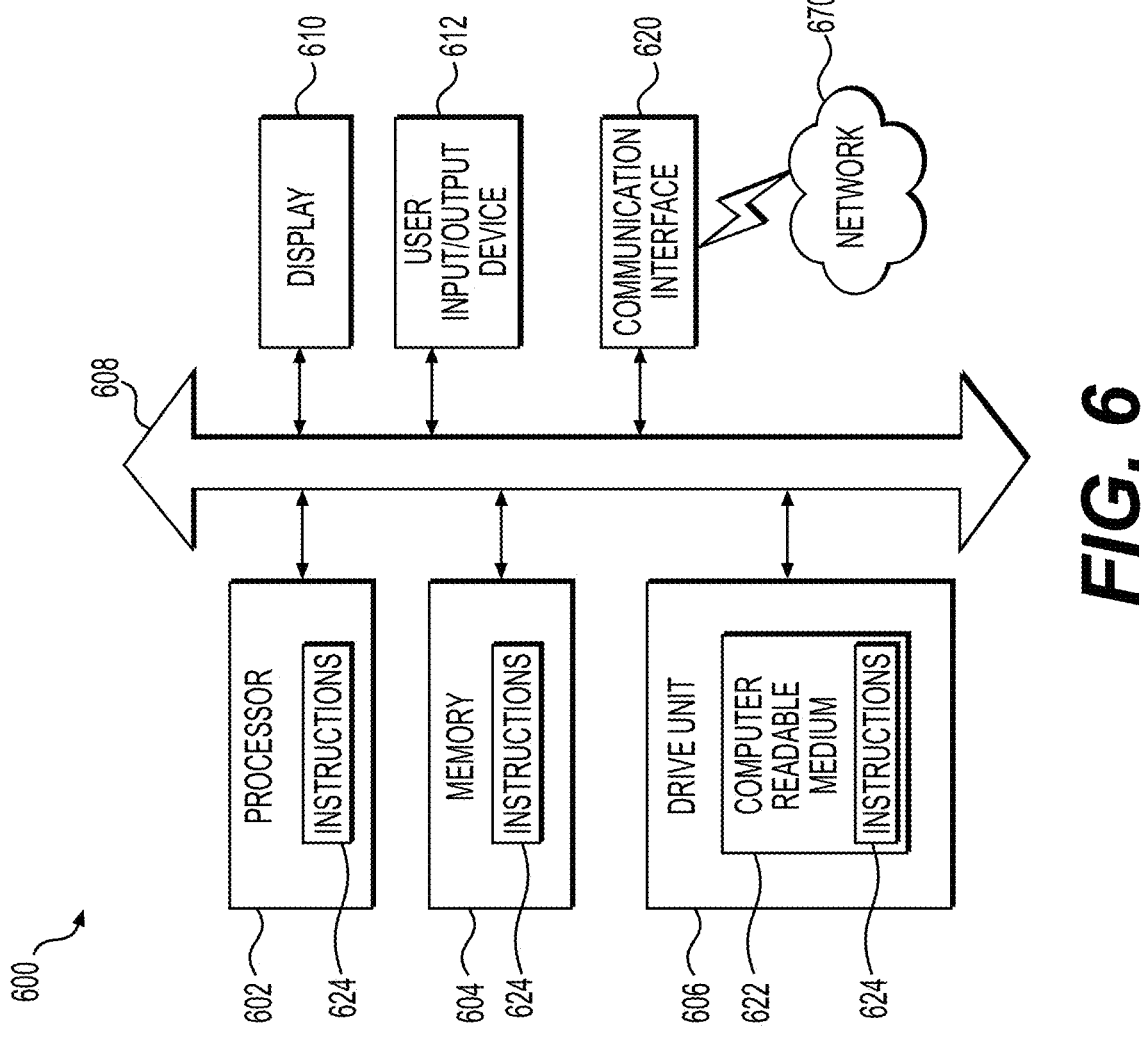
FIG. 6 depicts an exemplary computer system for executing the techniques described herein, according to one or more embodiments of the present disclosure.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog cir-cuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions stored in the memory 604. The functions, acts or tasks are independent of the particular type of instructions set, storage media, pro-cessor or processing strategy and may be performed by software, hardware, integrated circuits, firm-ware, micro-code and the like, operating alone or in combination. Like-wise, processing strategies may include multiprocessing, multitasking, parallel payment and the like.

As shown, the computer system 600 may further include a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input device 612 configured to allow a user to interact with any of the components of system 600. The input device 612 may be a number pad, a keyboard, or a cursor control device, such as a mouse, or a joystick, touch screen display, remote control, or any other device operative to interact with the computer system 600.

The computer system 600 may also or alternatively include a disk or optical drive unit 606. The disk drive unit 606 may include a computer-readable medium 622 in which one or more sets of instructions 624, e.g., software, can be embedded. Further, the instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instruc-tions 624 responsive to a propagated signal so that a device connected to a network 670 can communicate voice, video, audio, images, or any other data over the network 670. Further, the instructions 624 may be transmitted or received over the network 670 via a communication port or interface 620, and/or using a bus 608. The communication port or interface 620 may be a part of the processor 602 or may be a separate component. The communication port 620 may be created in software or may be a physical connection in hardware. The communication port 620 may be configured to connect with a network 670, external media, the display 610, or any other components in system 600, or combinations thereof. The connection with the network 670 may be a physical connection, such as a wired Ethernet connection or may be established wirelessly as discussed below. Likewise, the additional connections with other components of the system 600 may be physical connections or may be established wirelessly. The network 670 may alternatively be directly connected to the bus 608.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random-access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to one or more networks 670. The network 670 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 670 may include wide area networks (WAN), such as the Internet, local area networks (LAN), campus area networks, metropolitan area networks, a direct connection such as through a Universal Serial Bus (USB) port, or any other networks that may allow for data communication. The network 670 may be configured to couple one computing device to another computing device to enable communication of data between the devices. The network 670 may generally be enabled to employ any form of machine-readable media for communicating information from one device to another. The network 670 may include communication methods by which information may travel between computing devices. The network 670 may be divided into sub-networks. The sub-networks may allow access to all of the other components connected thereto or the sub-networks may restrict access between the components. The network 670 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer implemented method for tracking a data object in a data pipeline, the method including:
   receiving, at a first component, a data object from a data source, the data object indicating an occurrence of an information technology event, wherein the first component is a collection point;
   assigning, with the first component, a record number to the data object;
   determining a first tracking stamp for the data object, the first tracking stamp including the record number;
   broadcasting the first tracking stamp to a channel of a record tracking queue;
   initiating a record in the record tracking queue for the data object, the record including the record number, a station array, a station code, and a timestamp array, wherein the first tracking stamp updates the station array, station code, and timestamp array;
   transferring the data object to a second component;
   determining a second tracking stamp for the data object, the second tracking stamp including the record number;
   broadcasting the second tracking stamp to the channel;
   updating the record with the second tracking stamp to indicate that the data object was received by the second component;
   determining that the data object was not received at a downstream component, wherein the downstream component is downstream of the first component and the second component, wherein the determination is based on information for the data object in the tracking queue which indicates that the data object was transferred to the second component but was transferred to the downstream component; and
   retransferring the data object from the second component to the downstream component, thereby improving operation of the data pipeline.

2. The method of claim 1, wherein the first tracking stamp further includes a plurality of fields, the plurality of fields including a record number field that includes the record number.

3. The method of claim 2, wherein the plurality of fields further includes a first record queue field, a first record time entry field, and a first counter field,
   wherein the first record queue field records that the first tracking stamp was created at the collection point;
   wherein the first record time entry field records the time that the data object was received by the collection point; and
   wherein the first counter field records what number interconnected component the data object was received by.

4. The method of claim 1, wherein the record is stored as a log file in the record tracking queue.

5. The method of claim 1, wherein the updating the record to indicate that the data object was received by the second component further includes:
   updating the station array to include a string listing the second component;
   updating the timestamp array to include a time the data object was received by the second data object; and
   updating the station code to two.

6. The method of claim 1, further including:
   transferring the data object to a third component;

determining a third tracking stamp for the data object, the third tracking stamp including the record number;

broadcasting the third tracking stamp to the channel; and updating the record to incorporate that the data object was received by the third component.

7. The method of claim 1, further including:

attempting to transfer the data object to a fourth component, wherein the data object does not transfer to the fourth component;

upon a set interval of time occurring, applying a scan to the record tracking queue;

finding a most recent entry of the record number in the record;

identifying a most recent entry in the station queue array of the record, the most recent entry indicating the data object was most recently transferred to the second component; and transferring the data object to the fourth component.

8. A computer implemented system for tracking a data object in a data pipeline, the system comprising:

a memory having processor-readable instructions stored therein; and at least one processor configured to access the memory and execute the processor-readable instructions to perform operations including:

receiving, at a first component, a data object from a data source, the data object indicating an occurrence of an information technology event, wherein the first component is a collection point;

assigning, with the first component, a record number to the data object;

determining a first tracking stamp for the data object, the first tracking stamp including the record number;

broadcasting the first tracking stamp to a channel of a record tracking queue;

initiating a record in the record tracking queue for the data object, the record including the record number, a station array, a station code, and a timestamp array, wherein the first tracking stamp updates the station array, station code, and timestamp array;

transferring the data object to a second component;

determining a second tracking stamp for the data object, the second tracking stamp including the record number;

broadcasting the second tracking stamp to the channel;

updating the record with the second tracking stamp to indicate that the data object was received by the second component;

determining that the data object was not received at a downstream component, wherein the downstream component is downstream of the first component and the second component, wherein the determination is based on information for the data object in the tracking queue which indicates that the data object was transferred to the second component but was transferred to the downstream component; and retransferring the data object from the second component to the downstream component, thereby improving operation of the data pipeline.

9. The system of claim 8, wherein the first tracking stamp further includes a plurality of fields, the plurality of fields including: a record number field that includes the record number.

10. The system of claim 9, wherein the plurality of fields further includes a first record queue field, a first record time entry field, and a first counter field, wherein the first record queue field records that the first tracking stamp was created at the collection point;

wherein the first record time entry field records the time that the data object was received by the collection point; and wherein the first counter field records what number interconnected component the data object was received by.

11. The system of claim 8, wherein the record is stored as a log file in the record tracking queue.

12. The system of claim 8, wherein the updating the record to indicate that the data object was received by the second component further includes:

updating the station array to include a string listing the second component;

updating the timestamp array to include a time the data object was received by the second data object; and updating the station code to two.

13. The system of claim 8, further including:

transferring the data object to a third component;

determining a third tracking stamp for the data object, the third tracking stamp including the record number;

broadcasting the third tracking stamp to the channel; and updating the record to incorporate that the data object was received by the third component.

14. The system of claim 8, further including:

attempting to transfer the data object to a fourth component, wherein the data object does not transfer to the fourth component;

upon a set interval of time occurring, applying a scan to the record tracking queue;

finding a most recent entry of the record number in the record;

identifying a most recent entry in the station queue array of the record, the most recent entry indicating the data object was most recently transferred to the second component; and transferring the data object to the fourth component.

15. A non-transitory computer readable medium configured to store processor-readable instructions which, when executed by at least one processor, cause the at least one processor to perform operations in a data pipeline including:

receiving, at a first component, a data object from a data source, the data object indicating an occurrence of an information technology event, wherein the first component is a collection point;

assigning, with the first component, a record number to the data object;

determining a first tracking stamp for the data object, the first tracking stamp including the record number;

broadcasting the first tracking stamp to a channel of a record tracking queue;

initiating a record in the record tracking queue for the data object, the record including the record number, a station array, a station code, and a timestamp array, wherein the first tracking stamp updates the station array, station code, and timestamp array;

transferring the data object to a second component;

determining a second tracking stamp for the data object, the second tracking stamp including the record number;

broadcasting the second tracking stamp to the channel;

updating the record with the second tracking stamp to indicate that the data object was received by the second component;

determining that the data object was not received at a downstream component, wherein the downstream component is downstream of the first component and the second component, wherein the determination is based on information for the data object in the tracking queue which indicates that the data object was transferred to the second component but was transferred to the downstream component; and retransferring the data object from the second component to the downstream component, thereby improving operation of the data pipeline.

16. The non-transitory computer readable medium of claim 15, wherein the first tracking stamp further includes a plurality of fields, the plurality of fields including: a record number field that includes the record number.

17. The non-transitory computer readable medium of claim 16, wherein the plurality of fields further includes a first record queue field, a first record time entry field, and a first counter field, wherein the first record queue field records that the first tracking stamp was created at the collection point;

wherein the first record time entry field records the time that the data object was received by the collection point; and wherein the first counter field records what number interconnected component the data object was received by.

18. The non-transitory computer readable medium of claim 15, wherein the updating the record to indicate that the data object was received by the second component further includes:

updating the station array to include a string listing the second component;

updating the timestamp array to include a time the data object was received by the second data object; and updating the station code to two.

19. The non-transitory computer readable medium of claim 15, further including:

transferring the data object to a third component;

determining a third tracking stamp for the data object, the third tracking stamp including the record number;

broadcasting the third tracking stamp to the channel; and updating the record to incorporate that the data object was received by the third component.

20. The non-transitory computer readable medium of claim 15, further including:

attempting to transfer the data object to a fourth component, wherein the data object does not transfer to the fourth component;

upon a set interval of time occurring, applying a scan to the record tracking queue;

finding a most recent entry of the record number in the record;

identifying a most recent entry in the station queue array of the record, the most recent entry indicating the data object was most recently transferred to the second component; and transferring the data object to the fourth component.

* * * * *